United States Patent
Kobayashi (10) Patent No.: US 8,478,960 B2
(45) Date of Patent: Jul. 2, 2013

(54) INFORMATION PROCESSING APPARATUS AND MEMORY PROTECTION METHOD

(75) Inventor: Hidenori Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 12/949,247

(22) Filed: Nov. 18, 2010

(65) Prior Publication Data

US 2011/0145531 A1 Jun. 16, 2011

(30) Foreign Application Priority Data

Dec. 15, 2009 (JP) ................ 2009-284547
Nov. 4, 2010 (JP) ................ 2010-247843

(51) Int. Cl.
*G06F 12/14* (2006.01)
(52) U.S. Cl.
USPC ......................... 711/163; 711/152
(58) Field of Classification Search
None
See application file for complete search history.

(56) References Cited

U.S. PATENT DOCUMENTS 4,677,546 A * 6/1987 Freeman et al. ............ 711/203
2010/0280817 A1* 11/2010 Unseld ......................... 703/21

FOREIGN PATENT DOCUMENTS

| CN | 101281506 A | 10/2008 |
| JP | 2002-189633 | 7/2002 |

OTHER PUBLICATIONS

Chinese Office Action, dated Jan. 21, 2013, issued by the State Intellectual Property Office of the People's Republic of China, in Chinese Application No. 201010592027.6.

* cited by examiner

*Primary Examiner* — Than Nguyen
(74) *Attorney, Agent, or Firm* — Fitzpatrick, Cella, Harper & Scinto (57) ABSTRACT

A memory protection method of dividing the address space of a memory into two or more protection regions, and protecting the memory from an unauthorized access to a protection region by a program includes a definition step of defining the relation between protection regions, a determination step of, when the relation between the protection regions is an inclusion relation, determining that an included protection region cannot directly access an including protection region and the including protection region can directly access the included protection region, and a step of, when an access to the protection region determined to be able to be directly accessed is requested, permitting a direct access to the protection region determined to be able to be directly accessed, and prohibiting a direct access to the protection region determined to be unable to be directly accessed.

11 Claims, 8 Drawing Sheets

| ADDRESS RANGE OF ACCESS DESTINATION | EXECUTION MODULE UPON GENERATION OF EXCEPTION | | | | |
|---|---|---|---|---|---|
| | A | B | C | D | OS |
| 0x0000 - 0x0FFF | O | O | O | O | O |
| 0x1000 - 0x1FFF | × | × | × | × | × |
| 0x2000 - 0x27FF | × | × | × | × | × |
| 0x2800 - 0x2FFF | × | × | × | × | × |
| 0x3000 - 0x37FF | × | × | × | × | × |
| 0x3800 - 0x39FF | × | × | × | × | × |
| 0x3A00 - 0x3FFF | × | × | × | × | × |

O: ACCESS PERMITTED
×: ACCESS PROHIBITED

| INCLUDING PROTECTION REGION | INCLUDED PROTECTION REGION |
|---|---|
| OS | A, B, D |
| A | C |
| B | C |

| ACCESS DESTINATION REGION | EXCEPTIONAL HANDLER | | | | |
|---|---|---|---|---|---|
| | EXP1 | EXP2 | ISR1 | ISR2 | |
| 0x0000 - 0x0FFF | A | A | A | A | |
| 0x1000 - 0x1FFF | N | N | A | N | |
| 0x2000 - 0x27FF | A | N | N | N | |
| 0x2800 - 0x2FFF | N | N | N | N | |
| 0x3000 - 0x37FF | N | N | A | N | |
| 0x3800 - 0x39FF | N | N | N | N | |
| 0x3A00 - 0x3FFF | N | N | N | A | |

409

A: ACCESS
N: NO ACCESS

FIG. 9A

| ADDRESS RANGE OF ACCESS DESTINATION | ACCESS IDENTIFIER |
|---|---|
| | EXP1 |
| 0x0000 - 0x0FFF | 1 |
| 0x1000 - 0x1FFF | -1 |
| 0x2000 - 0x27FF | 2 |
| 0x2800 - 0x2FFF | 3 |
| 0x3000 - 0x37FF | 4 |
| 0x3800 - 0x39FF | -1 |
| 0x3A00 - 0x3FFF | 5 |

| 31 | ... | 4 | 3 | 2 | 1 |
|---|---|---|---|---|---|
| ... | | | | | |

962

INFORMATION PROCESSING APPARATUS AND MEMORY PROTECTION METHOD

BACKGROUND OF THE INVENTION

1. Field of the Invention

The present invention relates to a memory protection method and information processing apparatus that protects a memory from an unauthorized access by a program.

2. Description of the Related Art

As a conventional method to protect a memory from an unauthorized access by a program, the execution mode of a central processing unit (CPU) and the function of a memory management unit (MMU) are generally combined. For example, a region accessible in the privileged mode (or highly privileged mode) using the function of the MMU, and a region accessible in both the privileged and non-privileged modes are set using a CPU which discriminates executions in the privileged and non-privileged modes (or privileged modes having a plurality of levels). A memory region usable in only the privileged mode can be set against an unauthorized access in the non-privileged mode. In this method, a region to be protected cannot be freely set independently of the execution mode, but all built-in software programs are often executed in the privileged mode.

As a method of protecting a memory from unauthorized accesses by programs which are executed in the same execution mode, a program is divided into one or more modules, and the respective modules are arranged in unique virtual address spaces. In general, function modules arranged in different virtual address spaces cannot directly access a memory region arranged in another address space (cannot access it without the mediacy of the OS or the like). This can prevent an unauthorized access between modules arranged in address spaces. However, this method needs to use the function of the operating system (OS) in order to access data of another module in response to a function call between modules. Data is generally copied in the OS, decreasing the execution efficiency, compared to directly accessing data of another module.

As a method of protecting a memory from an unauthorized access in a unity address space, there is known a method using an identifier for both a region obtained by dividing a unity address space, and a module (for example, Japanese Patent Laid-Open No. 2002-189633). The module is prohibited from accessing a region having an identifier different from that of the module. When accessing another module, a special space switching program is executed to change the identifier of the access destination to that of the program before access. After the access, the identifier is returned to the original one, limiting an access other than a function call. In this case, data can be directly accessed by addressing. However, an operation regarding an identifier is required in a function call, so the execution efficiency becomes poor, compared to data reference based on a direct function call.

Conventionally, when using a memory protection function, an indirect function call needs to be used to access data held in a different protection region. Even when an access from a specific module in a different protection region is reliable, the accessing module needs to use the indirect function call. The indirect function call is poorer in execution efficiency than the direct function call, decreasing the execution efficiency.

SUMMARY OF THE INVENTION

The present invention provides a memory protection technique to reduce decreased execution efficiency by enabling a direct procedure call and access from a module which is determined by an access destination module to have high reliability, when no indirect function call is executed, detecting, as an unauthorized access, an access from a module determined to have low reliability, and when an indirect function call is executed, detecting it as an authorized access.

According to one aspect of the present invention, there is provided a memory protection method of dividing an address space of a memory into at least two protection regions, and protecting the memory from an unauthorized access to a protection region by a program, the method comprising: a definition step of defining a relation between protection regions; a determination step of, when the relation between the protection regions is an inclusion relation, determining that an included protection region cannot directly access an including protection region and the including protection region can directly access the included protection region; and a memory management step of permitting a direct access for an access for which a direct access is determined to be possible, and prohibiting a direct access for an access for which a direct access is determined to be impossible.

According to another aspect of the present invention, there is provided a memory protection method of dividing an address space of a memory into at least two protection regions, and protecting the memory from an unauthorized access to a protection region by a program, the method comprising accessing the protection region from a module having high reliability by a function call, prohibiting an access to the protection region from a module having low reliability by a function call, and accessing the protection region from the module having low reliability by an indirect procedure call.

According to still another aspect of the present invention, there is provided an information processing apparatus which divides an address space of a memory into at least two protection regions, and protects the memory from an unauthorized access to a protection region by a program, the apparatus comprising: a definition unit adapted to define a relation between protection regions; a determination unit adapted to, when the relation between the protection regions is an inclusion relation, determine that an included protection region cannot directly access an including protection region and the including protection region can directly access the included protection region; and a memory management unit adapted to permit a direct access for an access for which a direct access is determined to be possible, and prohibit a direct access for an access for which a direct access is determined to be impossible.

The present invention can provide a memory protection technique of reducing a decrease in execution efficiency by enabling a direct access to a protection region determined to have high reliability, and suppressing, as an unauthorized access, a direct access to a protection region determined to have low reliability.

Further features of the present invention will become apparent from the following description of exemplary embodiments (with reference to the attached drawings).

DESCRIPTION OF THE EMBODIMENTS

First Embodiment

An information processing system in the first embodiment includes two information processing apparatuses 1 and 2. The information processing apparatus 1 generates a verification target image from a verification target program, and the information processing apparatus 2 executes and verifies the verification target image.

Figure 1A:
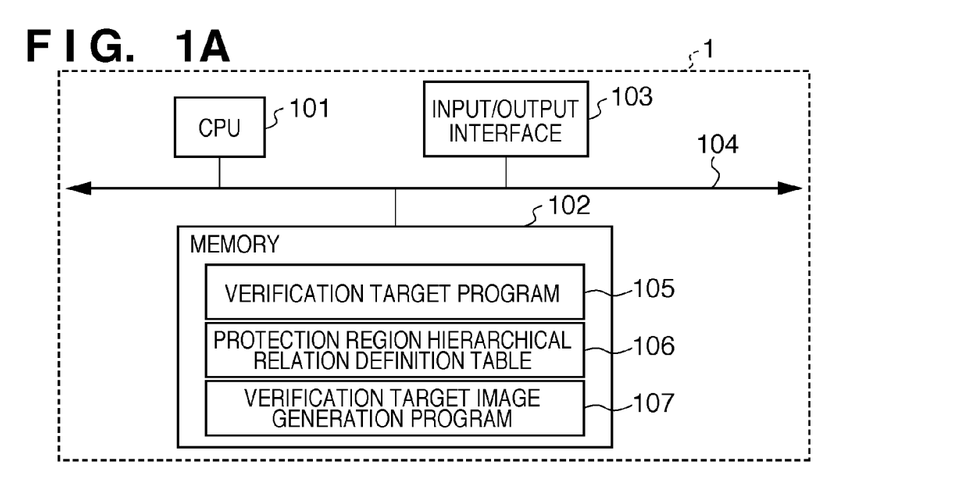
FIGS. 1A and 1B are block diagrams for explaining the arrangements of information processing apparatuses in the first embodiment.

FIG. 1A shows the arrangement of the information processing apparatus 1 according to the first embodiment. A central processing unit (CPU) 101 controls the overall information processing apparatus 1 in FIG. 1A. A memory 102 is formed from a ROM which stores programs and parameters that need not be changed, and a RAM which temporarily stores programs and data supplied from an external device and the like. An input/output interface 103 ensures connection with the information processing apparatus 2. A system bus 104 connects the CPU 101, memory 102, and input/output interface 103 to be able to communicate with each other.

A verification target program 105 in the memory 102 may include an unauthorized access, and is made up of modules A, B, C, and D in the embodiment. An unauthorized access arises from a program bug or the like, and an access generated intentionally is regarded as an authorized access. Assume that the verification target program 105 describes, as a direct function call, a function call when a calling module is reliable, and describes function calls in other cases as indirect procedure calls to be described later. Also, assume that an access between modules is necessary only in a function call. A table 106 (protection region hierarchical relation definition table) defines the hierarchical relation between protection regions. A program 107 (verification target image generation program) generates a verification target image.

Figure 1B:
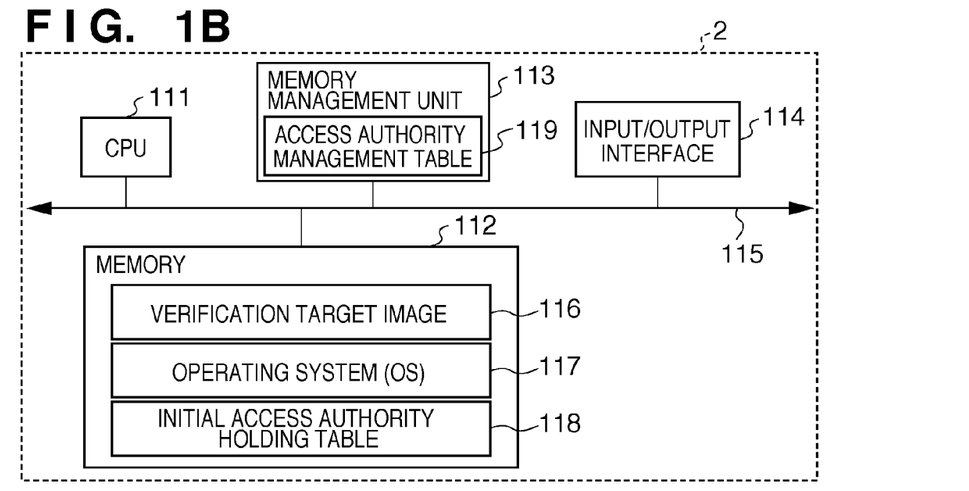

FIG. 1B shows the arrangement of the information processing apparatus 2 according to the first embodiment. The information processing apparatus 2 can divide the address space of the memory into two or more protection regions, and protect the memory from an unauthorized access to the protection region by a program. A central processing unit (CPU) 111 controls the overall information processing apparatus 2. A memory 112 is formed from a ROM which stores programs and parameters that need not be changed, and a RAM which temporarily stores programs and data supplied from the information processing apparatus 1. A memory management unit (MMU) 113 serving as a memory management device determines the validity of an access requested of another unit from the CPU 101. The memory management unit 113 also serves as a memory protection unit (MPU) and may be incorporated in the CPU 111. By looking up an access authority management table 119, the memory management unit 113 permits or limits an access from the CPU 111 to the memory 112. The access authority management table 119 may be arranged in the memory 112. Upon receiving an access request from the CPU 111, the memory management unit 113 searches the access authority management table 119 for an entry corresponding to the access destination address, and determines whether the access is one to an accessible protection region or to an inaccessible protection region. When the memory management unit 113 detects a limited access request, it notifies the CPU 111 of this event. An input/output interface 114 ensures connection with the information processing apparatus 1. However, the input/output interface 114 does not generate an interrupt during execution of a verification target image 116. A system bus 115 connects the CPU 111, memory 112, memory management unit 113, and input/output interface 114 to be able to communicate with each other.

The information processing apparatus 1 transfers the verification target image 116 in the memory 112. An operating system 117 makes initial setting of the memory management unit 113. An initial access authority holding table 118 holds the initial set values of the access authority management table 119.

Figure 1C:
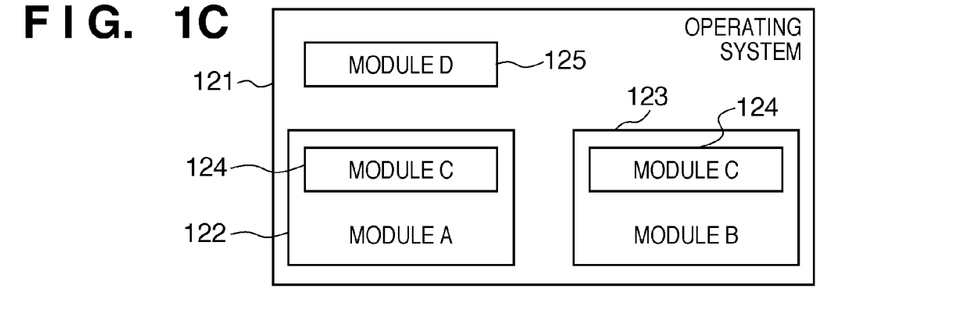
FIG. 1C is a block diagram for explaining the hierarchical relation between protection regions.

FIG. 1C conceptually shows the hierarchical relation between protection regions. The protection region is a region for protecting module data. For example, a protection region for module A is a region for protecting data of module A. A protection region for module C includes protection regions for modules A and B. A protection region for the operating system includes protection regions for modules A, B, C, and D. The remaining relations (other than inclusion relations) are equal relations. Assume that, when protection regions have an inclusion relation, an access from an including protection region to an included one does not contain an unauthorized access. To the contrary, assume that an access from an included protection region to an including region or an access to a protection region having an equal relation may contain an unauthorized access.

Figure 8A:
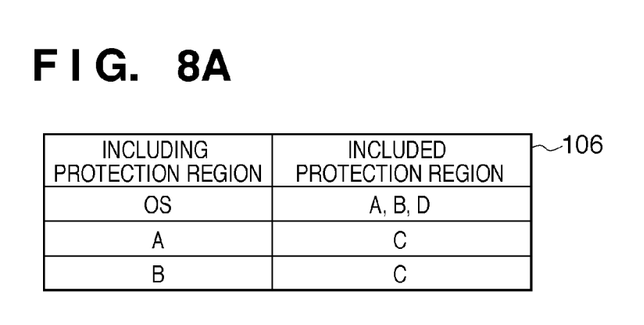
FIG. 8A is a table for explaining a protection region hierarchical relation definition table.

FIG. 8A is a table exemplifying the protection region hierarchical relation definition table 106 which defines the relation between protection regions shown in FIG. 1C. To define the hierarchical relation between protection regions, the protection region hierarchical relation definition table 106 describes only the inclusion relations between protection regions. An undescribed relation between protection region is an equal relation. For example, the protection regions for modules A and B have an equal relation.

First, processing in the information processing apparatus 1 will be explained. In the information processing apparatus 1, the verification target image generation program 107 determines the reliability between protection regions by looking up the protection region hierarchical relation definition table 106. When the protection regions have an inclusion relation, the verification target image generation program 107 determines that the reliability of the including protection region is high when viewed from the included protection region, and that of the included protection region is low when viewed from the including protection region. When the protection regions have an equal relation (not an inclusion relation), the verification target image generation program 107 determines that the reliability between the protection regions is low. For example, in FIG. 1C, a protection region 121 (including protection region) for the operating system 117 includes all the other protection regions (included protection regions). Hence, the reliability of the protection region 121 for the operating system 117 is high when viewed from all the other protection regions. In contrast, a protection region 122 for module A and a protection region 123 for module B have an equal relation. Thus, the reliabilities of the partners are low when viewed from the protection regions for modules A and B.

The verification target image generation program 107 further compiles the verification target program 105, generating the verification target image 116. The compiling result includes arrangement information of the verification target image 116 in a unity address space. The verification target image, the arrangement information in the unity address space, and the determination result of the reliability between protection regions are transferred from the information processing apparatus 1 to the information processing apparatus 2 via the input/output interfaces 103 and 114.

Next, processing in the information processing apparatus 2 will be explained. In the information processing apparatus 2, the arrangement information of the verification target image 116 in the unity address space, and the determination result of the reliability between protection regions are held in the initial access authority holding table 118 together with arrangement information of the OS in the unity address space.

Figure 2A:
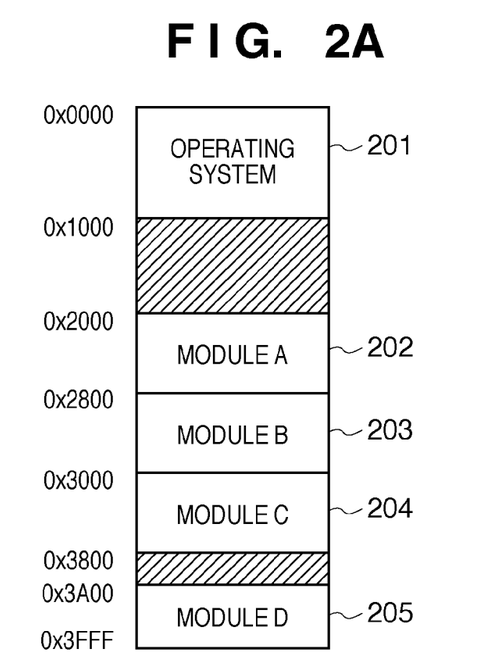
FIG. 2A is a view for explaining the arrangement of protection regions in a unity address space.

FIG. 2A exemplifies the arrangement of regions assigned to the operating system and verification target image in the unity address space. An address range assigned to the protection region of each module corresponds to a memory region assigned to each program. For example, an address range assigned to the protection region for the operating system is 0x0000 to 0x0FFF, and a memory region assigned to the operating system 117 can be accessed using addresses in this range.

Figure 2B:
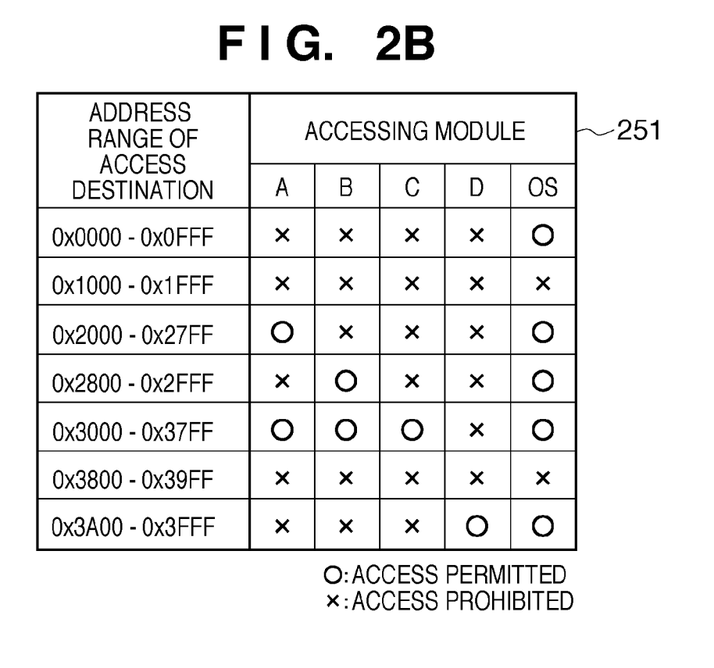
FIG. 2B is a table for explaining initial settings in an access authority management table.

FIG. 2B exemplifies the initial access authority holding table 118. The access authority management table 119 stores the results of determining, based on initial settings in the initial access authority holding table 118, a protection region determined to have high reliability and a protection region determined to have low reliability. The initial settings permit an access from a protection region determined by an accessing module to have high reliability, and limit an access from a protection region determined to have low reliability.

In the information processing apparatus 2, an access from a protection region determined to have low reliability is implemented using an indirect procedure call. The indirect procedure call allows an access from a protection region determined to have low reliability only during execution of the procedure call.

Figure 3:
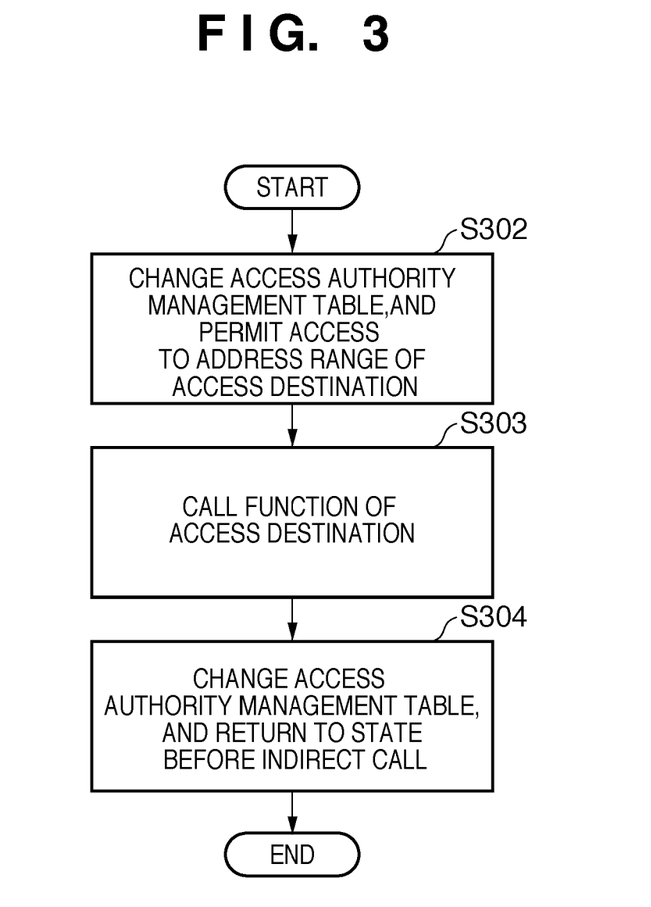
FIG. 3 is a flowchart for explaining processing of implementing an indirect procedure call in the first embodiment.

FIG. 3 shows processing of implementing an indirect procedure call. A processing sequence will be explained by exemplifying a case in which module A indirectly calls the procedure of module B. When an indirect procedure call is made in execution of module A, module A performs indirect procedure call processing to temporarily merge (combine) the protection regions for module A and module B. This is implemented by rewriting the contents of the access authority management table 119 by module A in step S302. More specifically, an entry for an access from module A to an address range of 0x2800 to 0x2FFF assigned to the protection region of module B serving as an access destination is rewritten from access prohibition to access permission. As a result, an access from module A to module B is permitted. Then, in step S303, module A directly calls, by a function call, a desired procedure provided by module B serving as an access destination. Finally, after return from the function call, module A separates the merged protection region again into protection regions before merging. This is implemented by writing back the access authority management table 119 to the original set values in step S304 to prohibit an access from module A to the address range of 0x2800 to 0x2FFF.

Figure 9A:
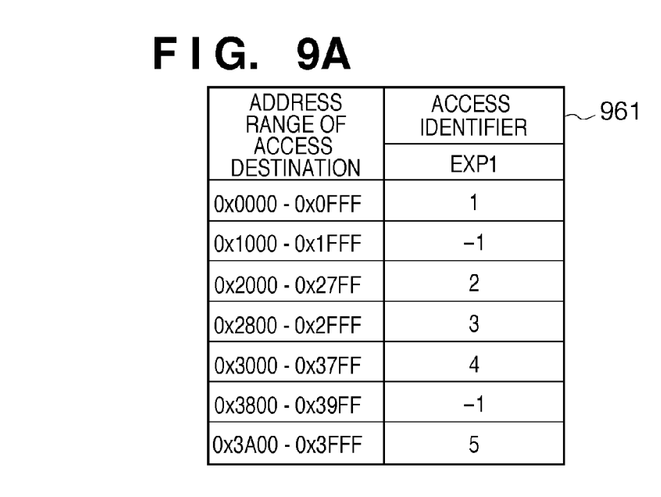
FIG. 9A is a table for explaining an access authority management table having an access identifier.
Figure 9B:
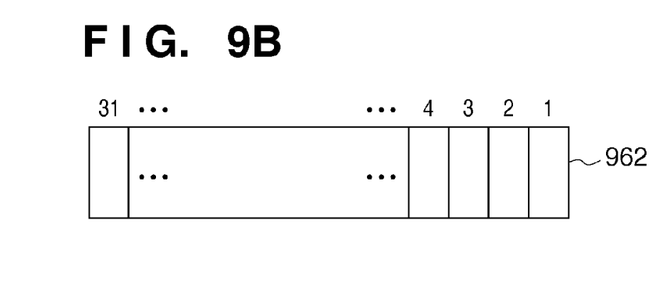
FIG. 9B is a view for explaining an access control vector.

Merging or separation of the protection regions may be implemented by changing the effective range of the access authority management table for module A. For example, an implementation method when using an MMU having an access authority management table 961 shown in FIG. 9A and an access authority control vector 962 shown in FIG. 9B will be explained. The access authority management table 961 holds an access identifier for the address range of an access destination. Whether to permit or prohibit an access is determined based on a combination of the access identifier and the access authority control vector 962. The access authority control vector 962 is a 32-bit string, and the respective bits correspond to access identifiers "1" to "31". When a bit corresponding to an access identifier assigned to the address range of an access destination is set in the access authority control vector 962, an access to the address range is permitted. If a corresponding bit is cleared, access is limited. For example, at the start of executing module A, the access authority control vector 962 is 0xa. Merging or separation of protection regions in an indirect procedure call is implemented by setting or clearing a corresponding bit in the access authority control vector 962. For example, when merging the protection regions of modules A and B in execution of module A, a bit corresponding to an access identifier "3" is set in the access authority control vector 962. When separating these protection regions, the bit corresponding to the access identifier "3" is cleared.

In this arrangement, an indirect procedure call is used for a function call from a protection region determined to have low reliability, and a direct procedure call is used for a function call from a protection region determined to have high reliability. A direct access from a protection region determined to have low reliability in a call other than an indirect function call is detected as an unauthorized access. In contrast, an access from a protection region determined to have high reliability is permitted even in a direct function call. Since the execution efficiency of the direct procedure call is higher than that of the indirect procedure call, a decrease in execution efficiency by memory protection can be suppressed.

The first embodiment can provide a memory protection technique that reduces a decrease in execution efficiency by enabling a direct procedure call for a protection region having high reliability, and prohibiting, as an unauthorized access, an access in a call other than an indirect procedure call to a protection region determined to have low reliability.

Second Embodiment

Figure 4A:
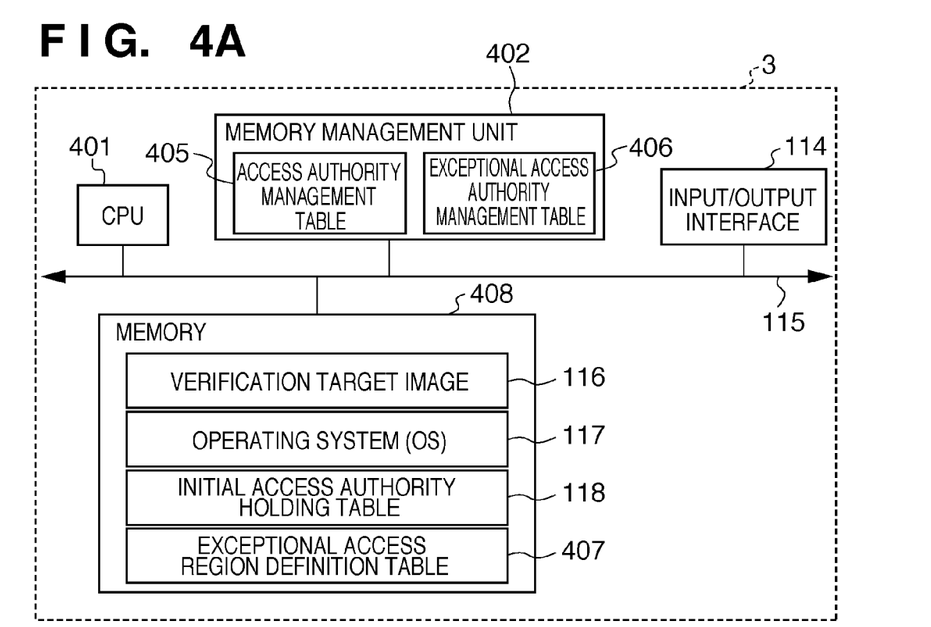
FIG. 4A is a block diagram for explaining the arrangement of an information processing apparatus in the second embodiment.

An information processing system in the second embodiment includes two information processing apparatuses 1 and 3. The information processing apparatus 1 is identical to that in the first embodiment. FIG. 4A shows the arrangement of the information processing apparatus 3 according to the second embodiment. A memory management unit 402 in the information processing apparatus 3 according to the second embodiment has an exceptional access authority management table 406. The exceptional access authority management table 406 may reside in a memory 408. The arrangement of protection regions in a unity address space and the relation between protection regions are the same as those in the first embodiment.

An input/output interface 114 can function as an input/output device for implementing communication with an external storage device or the user of the information processing apparatus 3. Further, the input/output interface 114 can connect a network device to be connected to an external device, and notify a CPU 401 of an interrupt. An interrupt may occur even during execution of a verification target image 116. The CPU 401 has an exceptional mode in which exceptional processing is executed, and a normal mode in which other processes are executed. Upon receiving an interrupt, the CPU 401 changes to the exceptional mode. The memory management unit 402 recognizes the execution mode of the CPU 401, and when the CPU 401 is in the normal mode, looks up an access authority management table 405 to determine whether to permit or prohibit an access. When the CPU 401 is in the exceptional mode, the memory management unit 402 looks up the exceptional access authority management table 406 to determine whether to permit or prohibit an access. Information held in the access authority management table 405 and exceptional access authority management table 406 is the same as that held in the access authority management table 119 in the first embodiment.

Figure 8B:
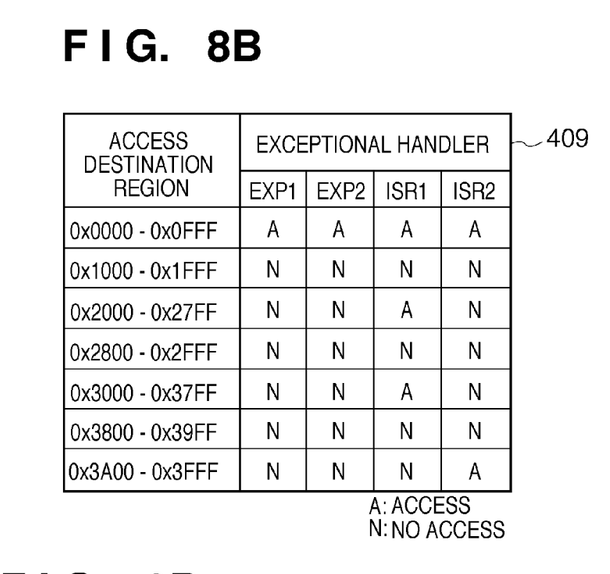
FIG. 8B is a table showing information held in an exceptional access region definition table.

An exceptional access region definition table 407 in the memory 408 may be generated by the information processing apparatus 3 or transferred from the information processing apparatus 1 together with the verification target image 116. FIG. 8B shows information held in the exceptional access region definition table 407. The exceptional access region definition table 407 defines a region which may be accessed in each exceptional processing. For example, an exceptional handler EXP1 may access only an address range of 0x0000 to 0x0FFF, and an exceptional handler ISR2 may access address ranges of 0x0000 to 0x0FFF and 0x3A00 to 0x3FFF.

Figure 4B:
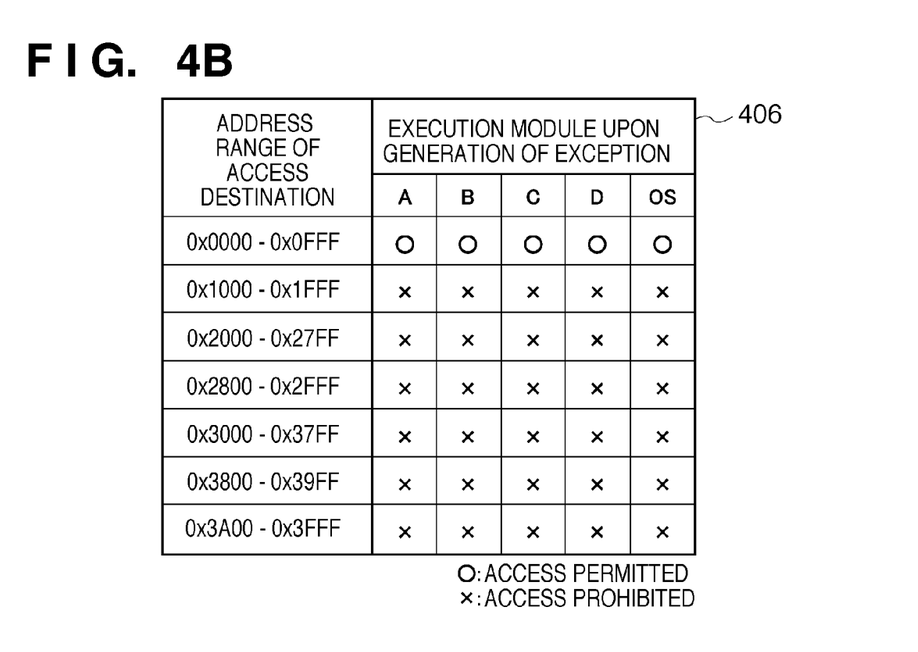
FIG. 4B is a table showing initial settings in an exceptional access authority management table.

FIG. 4B exemplifies initial settings in the exceptional access authority management table 406. According to these initial settings, only an address range of 0x0000 to 0x0FFF assigned to the operating system is accessible immediately after the CPU 401 changes to the exceptional mode.

Figure 5:
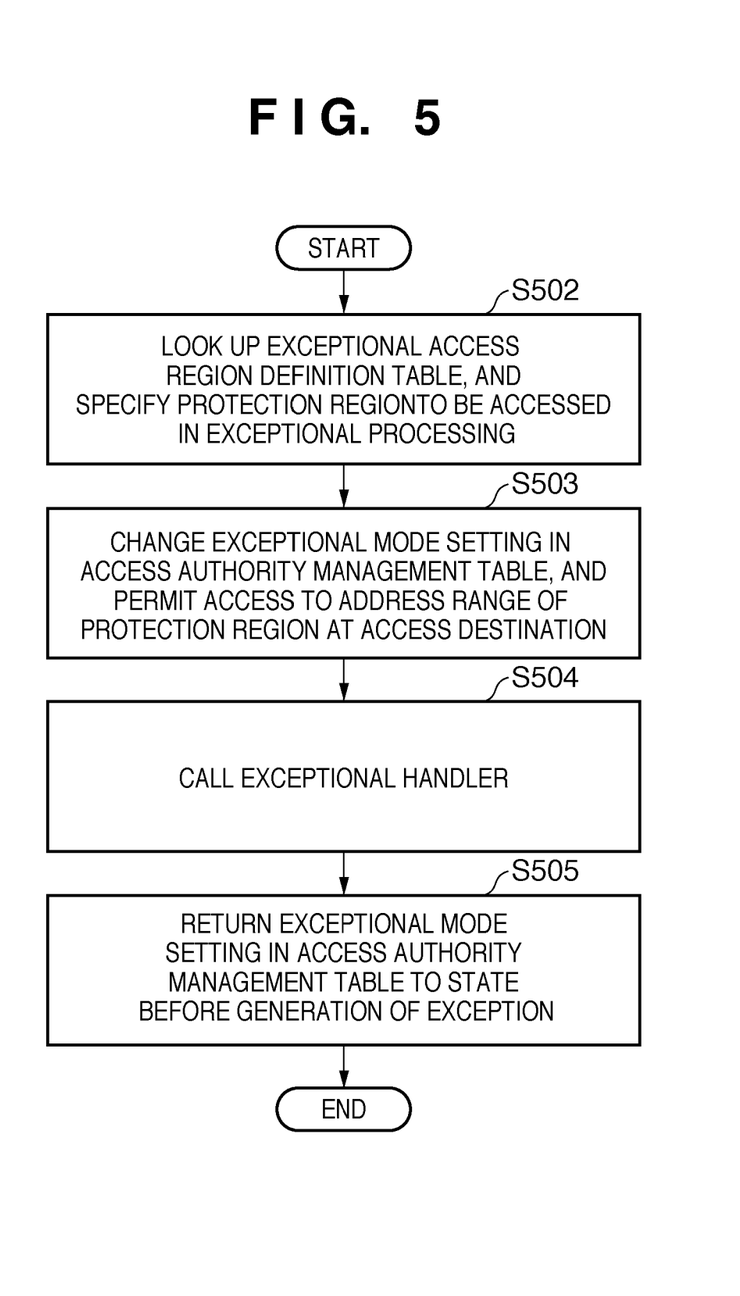
FIG. 5 is a flowchart showing processing of executing an exceptional handler in the second embodiment.

FIG. 5 shows processing of executing an exceptional handler upon generation of an exception. The processing will be explained by exemplifying processing when calling ISR2. When the CPU changes to the exceptional mode, the control shifts to the OS. In step S502, the OS looks up the exceptional access region definition table 407 to specify a protection region to be accessed by the exceptional handler ISR2. In step S503, the setting (FIG. 4B) in the exceptional access authority management table 406 is changed to permit an access from the exceptional handler ISR2 to address ranges of 0x0000 to 0x0FFF and 0x3A00 to 0x3FFF. Then, in step S504, the exceptional handler ISR2 is called. After the end of the exceptional handler ISR2, in step S505, the setting in the exceptional access authority management table 406 is changed and returned to the state before generation of the exception. The remaining operation is the same as that in the first embodiment.

This arrangement can prevent the memory of a protection region requiring no access from damage by an unauthorized access in execution of an exceptional handler. The exceptional handler can directly access a protection region requiring an access, without using an indirect function call. A decrease in response of interrupt processing by memory protection can therefore be suppressed.

Third Embodiment

Figure 6A:
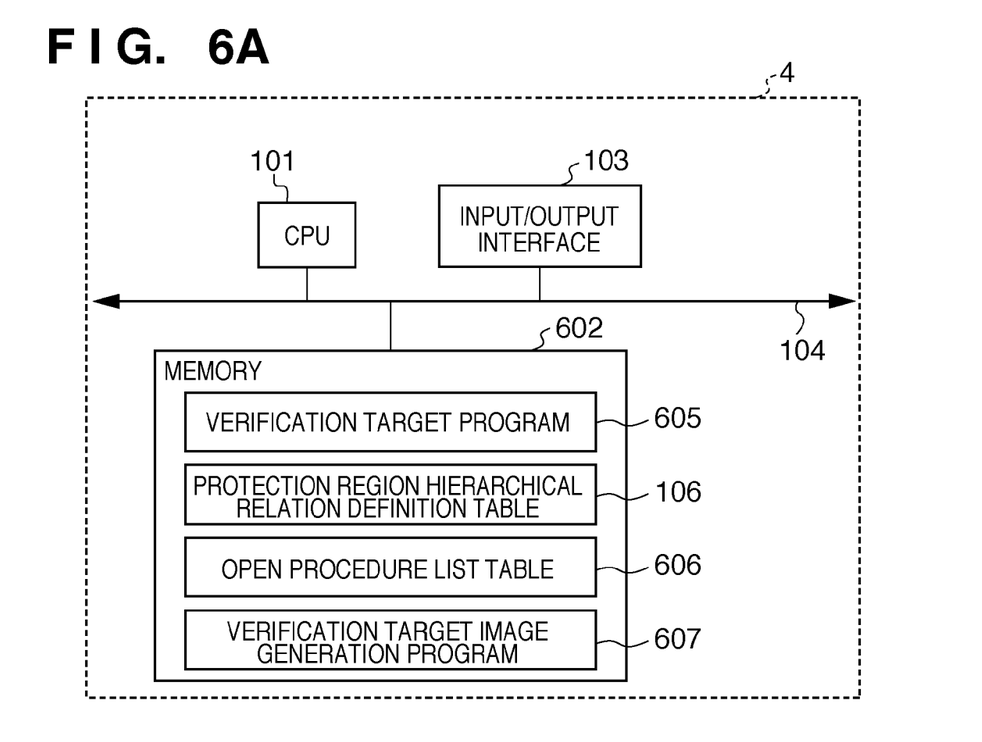
FIG. 6A is a block diagram for explaining the arrangement of an information processing apparatus in the third embodiment.

An information processing system in the third embodiment includes two information processing apparatuses 2 and 4. The information processing apparatus 2 is identical to that in the first embodiment. FIG. 6A shows the arrangement of the information processing apparatus 4 according to the third embodiment. The third embodiment is different from the first embodiment in that all function calls in a verification target program 605 are described as direct function calls, and the information processing apparatus 4 has an open procedure list table 606. The open procedure list table 606 lists the symbol names of procedures permitted to be called between protection regions.

Figure 7:
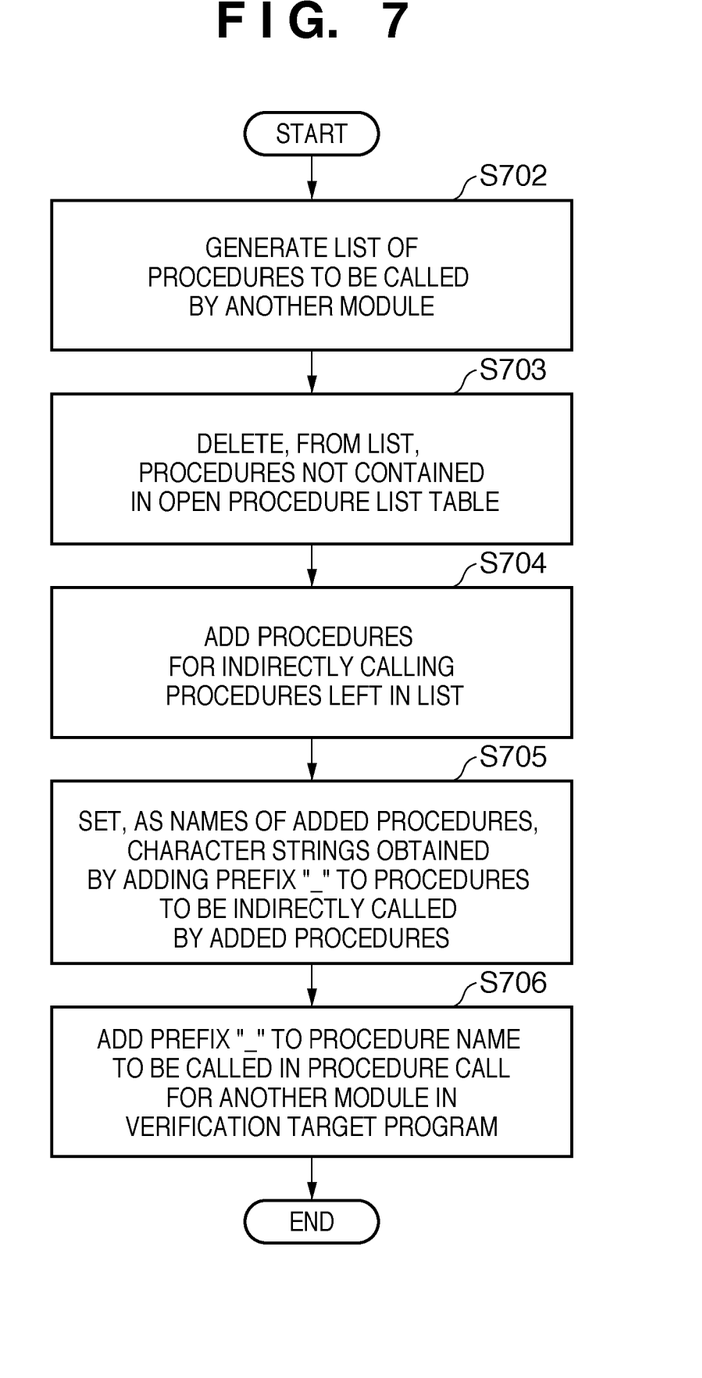
FIG. 7 is a flowchart for explaining processing of converting a procedure call for a region other than a protection region into an indirect procedure call.

FIG. 7 shows processing of converting a direct procedure call for a different protection region into an indirect procedure call. In compilation, a verification target image generation program 607 replaces a procedure call in the verification target program 605. First, in step S702, a list of procedures to be called by another module is generated. In step S703, procedures not contained in the open procedure list table 606 are deleted from the list generated in step S702. In step S704, procedures for indirectly calling the respective procedures left in the list in accordance with the sequence shown in FIG. 3 are added to the verification target program 605. In step S705, character strings obtained by adding a prefix "_" to the symbol names of procedures to be indirectly called by the procedures added in step S704 are set as the symbol names of the added procedures. Finally in step S706, if the list generated in step S703 contains the name of a procedure to be called in a procedure call across protection regions in the verification target program 605, the prefix "_" is added to the procedure name.

The procedure added in step S704 is arranged in a region where it can be directly called by a calling module. For example, an address range of 0x3800 to 0x39FF which is not assigned to any module is set as a region accessible from all modules. By arranging the added procedure in this region, the added procedure can be directly called from all modules.

Figure 6B:
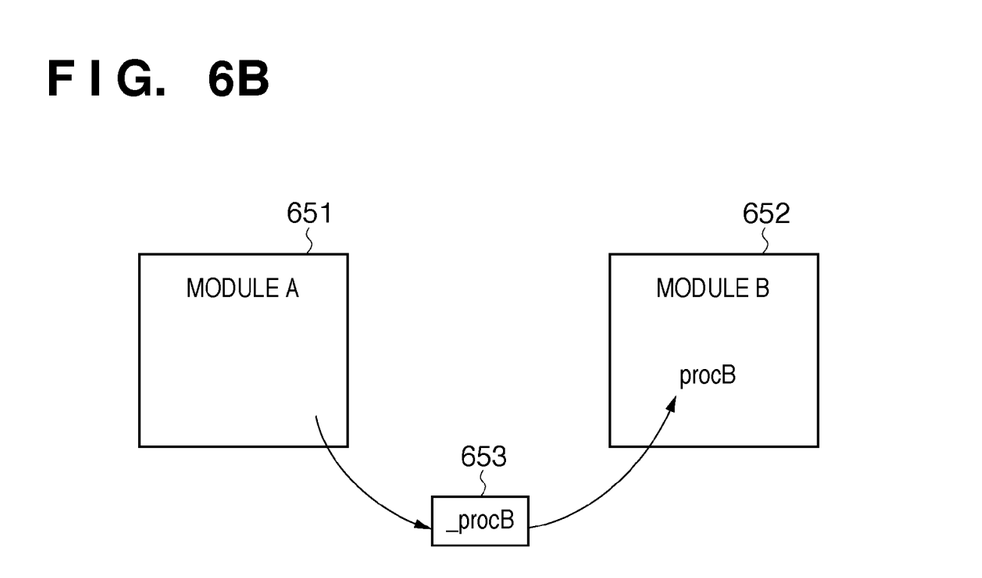
FIG. 6B is a view exemplifying a call relation after converting a procedure call in accordance with the flowchart of FIG. 7.

FIG. 6B is a conceptual view exemplifying a call relation after converting a procedure call in accordance with the flowchart of FIG. 7. In FIG. 6B, a direct function call procB from a module A 651 for a module B 652 is converted into a call _procB for an added procedure 653 in conversion processing. The added procedure 653 calls the procedure of the module B 652 by a direct function call. As a result, a function call from the module A 651 for the module B 652 becomes an indirect procedure call. The remaining operation is the same as that in the first embodiment.

The present invention is also applicable to a complier which determines, based on the inclusion relation between protection regions, whether to prohibit a direct access, and changes the description in accordance with the determination result.

The above-described arrangement can change the relation between protection regions without changing the verification target program 605 by the developer. The development efficiency can be increased, compared to changing the program.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-284547, filed Dec. 15, 2009, and Japanese Patent Application No. 2010-247843, filed Nov. 4, 2010, which are hereby incorporated by reference herein in their entirety.

What is claimed is:

1. A memory protection method of dividing an address space of a memory into at least two protection regions, and protecting the memory from an unauthorized access to a protection region by a program, the method comprising:
   a definition step of defining a relation between protection regions;
   a determination step of, when the relation between the protection regions is an inclusion relation, determining that an included protection region cannot directly access an including protection region and the including protection region can directly access the included protection region; and
   a memory management step of permitting a direct access for an access for which a direct access is determined to be possible, and prohibiting a direct access for an access for which a direct access is determined to be impossible,
   wherein in the determination step, determination results for a protection region determined to be able to be directly accessed and for a protection region determined to be unable to be directly accessed are stored in an access authority management table that defines a relation between the protection regions, and
   in the memory management step, when an access is requested to the protection region determined to be unable to be directly accessed, the protection region determined to be unable to be directly accessed, which is stored in the access authority management table, is changed to a protection region which can be directly accessed, and an indirect access to the protection region determined to be unable to be directly accessed is permitted.

2. The method according to claim 1, wherein in the determination step, when the relation between the protection regions is not an inclusion relation, the protection regions are determined to be unable to directly access each other.

3. The method according to claim 1, wherein in the memory management step, after an end of the indirect access to the protection region determined to be unable to be directly accessed, the protection region changed to the protection region which can be directly accessed is returned to the protection region which cannot be directly accessed, and a direct access to the protection region is prohibited as an unauthorized access.

4. The method according to claim 1, wherein the memory stores an exceptional access region definition table which defines a protection region that may be accessed in each exceptional processing.

5. The method according to claim 4, further comprising an input step of accepting an input of interrupt processing as exceptional processing,
   wherein in the memory management step, when the input of the interrupt processing is accepted as the exceptional processing in the input step, a protection region which may be accessed in the interrupt processing is obtained by looking up the exceptional access region definition table, and when the protection region is stored in the access authority management table as the protection region determined to be able to be directly accessed, a direct access to the protection region which may be accessed is permitted.

6. The method according to claim 5, wherein in the memory management step, when the protection region which may be accessed in the interrupt processing is stored in the access authority management table as the protection region determined to be unable to be directly accessed, the protection region determined to be unable to be directly accessed, which is stored in the access authority management table, is changed to the protection region which can be directly accessed, and an indirect access to the protection region which may be accessed is permitted.

7. The method according to claim 6, wherein in the memory management step, after an end of the interrupt processing, the protection region changed to the protection region which can be directly accessed, which is stored in the access authority management table, is returned to the protection region which cannot be directly accessed, and a direct access to the protection region is prohibited as an unauthorized access.

8. The method according to claim 1, wherein the memory management step includes a step of describing a program, an access for which a direct access is permitted is described by a function call, and an access for which a direct access is prohibited is described by an indirect procedure call.

9. The method according to claim 1, wherein the memory management step includes a step of executing a program, when a direct access is permitted, an access by a function call is executed, and when a direct access is prohibited, an access by an indirect procedure call is executed.

10. A memory protection method of dividing an address space of a memory into at least two protection regions, and protecting the memory from an unauthorized access to a protection region by a program, the method comprising:
    a determination step of, when the relation between the protection regions is an inclusion relation, determining that an included protection region cannot directly access an including protection region and the including protection region can directly access the included protection region;
    a first accessing step of accessing the protection region, determined to be able to be directly accessed, from a module having high reliability by a function call;
    a prohibiting step of prohibiting an access to the protection region, determined to be unable to be directly accessed, from a module having low reliability by a function call;
    wherein in the determination step, determination results of a protection region determined to be able to be directly accessed and a protection region determined to be unable to be directly accessed are stored in an access authority management table which defines a relation between the protection regions, and in the second accessing step, when an access is requested to the protection region determined to be unable to be directly accessed, the protection region determined to be unable to be directly accessed, which is stored in the access authority management table, is changed to a protection region which can be directly accessed, and an indirect access to the protection region determined to be unable to be directly accessed is permitted.

11. An information processing apparatus which divides an address space of a memory into at least two protection regions, and protects the memory from an unauthorized access to a protection region by a program, the apparatus comprising:
   a definition unit adapted to define a relation between protection regions;
   a determination unit adapted to, when the relation between the protection regions is an inclusion relation, determine that an included protection region cannot directly access an including protection region and the including protection region can directly access the included protection region; and
   a memory management unit adapted to permit a direct access for an access for which a direct access is determined to be possible, and prohibit a direct access for an access for which a direct access is determined to be impossible,
   wherein in the determination unit, determination results of a protection region determined to be able to be directly accessed and a protection region determined to be unable to be directly accessed are stored in an access authority management table which defines a relation between the protection regions, and
   in the memory management unit, when an access is requested to the protection region determined to be unable to be directly accessed, the protection region determined to be unable to be directly accessed, which is stored in the access authority management table, is changed to a protection region which can be directly accessed, and an indirect access to the protection region determined to be unable to be directly accessed is permitted.

* * * * *